US008739315B2

(12) United States Patent
Baacke

(10) Patent No.: US 8,739,315 B2
(45) Date of Patent: Jun. 3, 2014

(54) GARMENT WITH NON-PENETRATING TOUCH-SENSITIVE FEATURES

(75) Inventor: Dennis Baacke, Irma, WI (US)

(73) Assignee: JMI Sportswear Pte. Ltd., Singapore (SG)

( * ) Notice: Subject to any disclaimer, the term of this patent is extended or adjusted under 35 U.S.C. 154(b) by 360 days.

(21) Appl. No.: 13/196,435

(22) Filed: Aug. 2, 2011

(65) Prior Publication Data

US 2012/0096621 A1  Apr. 26, 2012

Related U.S. Application Data

(60) Provisional application No. 61/406,310, filed on Oct. 25, 2010, provisional application No. 61/420,061, filed on Dec. 6, 2010, provisional application No. 61/420,063, filed on Dec. 6, 2010.

(51) Int. Cl.
*A41D 19/00* (2006.01)

(52) U.S. Cl.
USPC ..................... 2/163; 2/160; 2/161.6

(58) Field of Classification Search
USPC .......... 2/159, 160, 161.6, 163, 162, 167, 158, 2/161.7, 169; 345/174, 179, 173, 156; 174/70 R, 71 R, 72 R
See application file for complete search history.

(56) References Cited

U.S. PATENT DOCUMENTS

| | | | | |
|---|---|---|---|---|
| 2,685,021 A * | 7/1954 | Duncan | | 219/211 |
| 2,888,767 A * | 6/1959 | Pinkus | | 2/245 |
| 3,292,628 A * | 12/1966 | Maxwell et al. | | 607/111 |
| 5,248,548 A * | 9/1993 | Toon | | 428/222 |
| 6,338,162 B1 | 1/2002 | Geng | | |
| 7,884,797 B1 * | 2/2011 | Ning | | 345/156 |
| 8,336,119 B2 * | 12/2012 | Phelps et al. | | 2/167 |
| 8,400,256 B2 * | 3/2013 | Matthews | | 338/99 |
| 2002/0130673 A1 | 9/2002 | Pelrine et al. | | |
| 2002/0163495 A1 | 11/2002 | Doynov | | |
| 2005/0151722 A1 | 7/2005 | Meteyer | | |
| 2005/0229284 A1 | 10/2005 | Gaetz | | |
| 2005/0231471 A1 | 10/2005 | Mallard et al. | | |
| 2007/0136925 A1 | 6/2007 | Bell | | |
| 2007/0174946 A1 * | 8/2007 | Yue | | 2/159 |
| 2007/0245454 A1 * | 10/2007 | Eklund | | 2/161.6 |

(Continued)

FOREIGN PATENT DOCUMENTS

WO    2005102088 A1    11/2005

OTHER PUBLICATIONS

Laurie A. Duncan, iGlove Multi iPod Gloves, website http://www.tuaw.com/2006/12/12/iglove-multi-ipod-gloves/, Oct. 5, 2011.

*Primary Examiner* — Amy Vanatta
(74) *Attorney, Agent, or Firm* — Boyle Fredrickson, S.C.

(57) ABSTRACT

A garment including a shell adapted to receive a portion of a body of a wearer therein, the shell having an interior surface, an exterior surface and an aperture is provided. The garment also includes a conductive member having a first end disposed on the interior surface of the shell, a second end disposed on the exterior surface of the shell, and extending through the aperture to connect the first end and the second end where the conductive member enables the wearer to interact with an electronic device having a capacitive-type touch-sensing interface.

16 Claims, 3 Drawing Sheets

(56) References Cited

U.S. PATENT DOCUMENTS

| | | |
|---|---|---|
| 2008/0282446 A1 | 11/2008 | Komlos |
| 2009/0000010 A1 | 1/2009 | Sunder et al. |
| 2009/0066658 A1 | 3/2009 | Earl |
| 2009/0183297 A1 | 7/2009 | Drosihn |
| 2010/0039392 A1 | 2/2010 | Pratt |
| 2010/0090966 A1 | 4/2010 | Gregorio |
| 2011/0278061 A1* | 11/2011 | Farnan .................. 174/70 R |
| 2011/0289654 A1* | 12/2011 | Williams et al. .................. 2/167 |

* cited by examiner

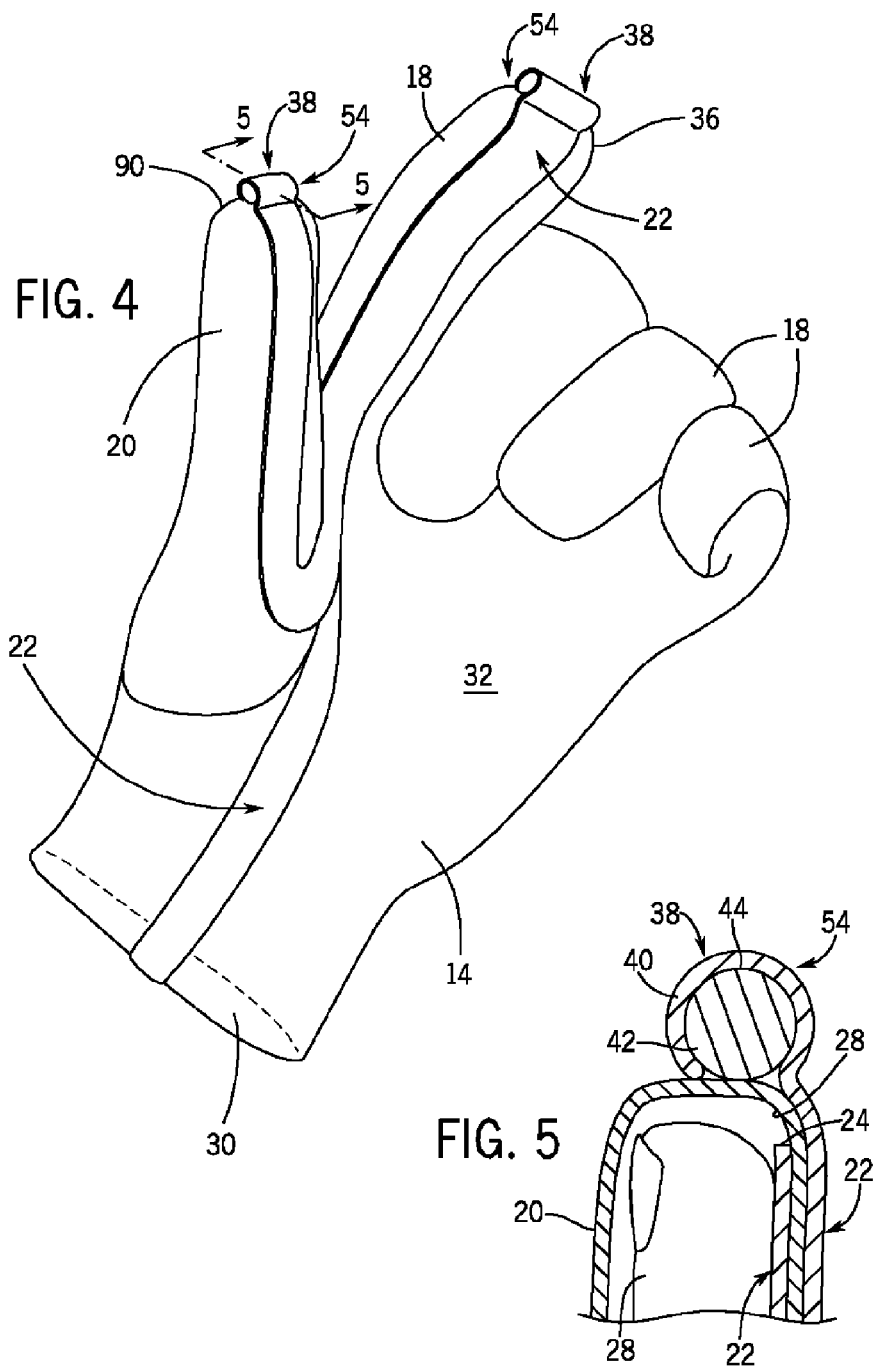

GARMENT WITH NON-PENETRATING TOUCH-SENSITIVE FEATURES

CROSS-REFERENCE TO RELATED APPLICATIONS

This application claims priority from U.S. Provisional Application Ser. No. 61/420,063, filed on Dec. 6, 2010, U.S. Provisional Application Ser. No. 61/420,061, filed on Dec. 6, 2010, and U.S. Provisional Application Ser. No. 61/406,310, filed on Oct. 25, 2010, the entirety of which are each expressly incorporated herein by reference.

FIELD OF THE INVENTION

The present invention relates generally to a garment, and more specifically to a garment having touch-sensitive features.

BACKGROUND OF THE INVENTION

There are many types of electronic devices that are used for various reasons, including but not limited to, communications, entertainment, work, and maintaining information such as contacts and appointments. Many electronic devices are continuously decreasing in size while increasing in functionality. In addition, several of these types of electronic devices are portable, including phones, pagers, communicators, electronic organizers, personal digital assistants, and digital audio and/or video playing devices such as iPods® or MP3 players.

As a result of the decreasing size of the devices, the controls for the devices have correspondingly shrunk in size. The particular controls and methods of input for different electronic devices can vary. Some devices may include mechanical or electromechanical buttons or switches that can be activated by a user contacting the button or switch.

Other electronic devices utilize a touch-sensitive technology for the interaction between the user and the device. One example of a touch sensitive technology is a touch screen which is an interactive screen that can be contacted by a user. Another example of a touch-sensitive technology is a track pad. The touch-sensitive technologies or applications sense and track a user's touch and its subsequent movement.

Some of the applications of these touch-sensitive technologies are resistive-type systems that include a resistive layer of material and a conductive layer of material that are disposed proximate to each other and separated by a narrow space of air. When a user touches a resistive-type screen or pad, the two layers contact each other in that exact spot, thereby changing the electric field and the particular spot can be identified. Thus, a resistive-type system registers a touch or input as long as the two layers make contact. The contact can be made using any type of object.

Other applications of these touch-sensitive technologies are capacitive-type systems that include a conductive layer of material that stores an electrical charge. When a user touches a capacitive-type screen or pad, a portion of the charge is transferred between the user and the screen or pad. As a result, the charge on the capacitive layer changes. Once this change occurs, the particular location of the change can be determined by a controller. A capacitive system needs a conductive input to register a touch or input. Such a conductive input can be made using a portion of a user's body, such as a finger.

In an electronic device with a capacitive-type touch-sensing interface, a controller supplies electrical current to metal channels or conductors that form a grid and conduct electricity. When another conductor, such as a user's finger, is moved close to the grid, current wants to flow to the finger to complete a circuit. Typically, the electronic device includes a non-conductive item, such as a non-conductive piece of plastic, in the way. Thus, a charge builds up at a point on the grid that is the closest to the finger. The build up of electrical charge between two conductors is called capacitance. The controller of the electronic device measures any changes in capacitance and a signal is generated and sent to the microprocessor of the electronic device.

When resistive-type and capacitive-type touch-sensing technologies are utilized on electronic devices, these touch-sensing technologies use capacitive and resistive buttons which can replace the small mechanical button and switch input devices to maximize the available space on the device. As mentioned above, capacitive touch-sensing requires a conductive input to register a touch by a user. While a conductive input can be accomplished through the touch of a user, such a conductive input is difficult when a user is wearing a garment covering the portion of the user's body intended to provide the conductive input, such as a hand covering.

Garments, such as hand coverings including gloves and mittens, are worn for protection from cold weather or other environmental conditions. There is a decrease in tactile sensitivity in the touch-sensitive technologies utilized as input mechanisms for the devices when a user is wearing a conventional garment. In addition, conventional garments do not allow a user to provide a necessary conductive input to an electronic device. Accordingly, to operate and utilize many electronic devices, a user must remove the garment in order to effectively interact with the devices having touch-sensitive control inputs.

In an attempt to remedy this situation, certain garments have been developed that enable the wearer to interact with a touch-sensitive (resistance or conductive) input device without removing the garment by replacing portions of the material forming the garment with section of a conductive material. However, while this enables the individual wearing the garment to interact with the device, if the garment is to be formed to be weatherproof, waterproof, or otherwise protect the wearer from contact with the elements, for example, the replacement of the material of the garment with the conductive material necessarily creates a gap in the impervious material from which the garment is formed, such that there is the potential for water or other material to enter the interior of the garment.

Additionally, with many types of garments, the primary function of the garment is to protect, insulate or otherwise isolate the wearer within the garment from the outside environment. Garments of this type normally have multiple layers forming the garment to provide the necessary protection for the wearer. However, these multiple layers can prevent conductive materials from being able to transmit electric signals from the body of a wearer through all of the various layers in order to enable the wearer to interact with or control a capacitive or conductive input-sensing device while wearing the garment.

Thus, it is desirable to develop a garment that enables the wearer to provide conductive input to an electronic device, but that also has a uniform and unbroken layer surrounding the body portion of the wearer on which the garment is positioned, such that the garment is effectively weatherproof or waterproof.

SUMMARY OF THE INVENTION

Briefly described, one aspect of the present invention provides a garment, such as a hand covering including several finger receptacles and a thumb receptacle. The garment also includes at least one tactility component or conductive member coupled thereto. In one embodiment, the conductive member is coupled at one end within the interior of the garment, such as in a finger receptacle of a hand covering, in order to be positioned in contact with the finger. The conductive member is formed from one or more materials that facilitate a conductive input to an electronic device and extends from the interior of the garment through an aperture of the garment that is adapted to receive a portion of the wearer's body therethrough and is spaced from the position of the body portion in the garment. From the aperture, the conductive member extends along the exterior of the garment such that it can be positioned in direct contact with an electronic device. Thus, when in contact with the device, the conductive input from the wearer can be transmitted from the inside of the garment along the conductive member to the electronic device, without violating the integrity of the waterproof or weatherproof nature of the garment and without the wearer having to remove the hand covering for such an input.

According to another aspect of the present invention, the garment has a projection extending from one or more portions of the garment. The projection is operably connected to the conductive member in order to enable signals generated by the component to be transmitted through the conductive member to the projection. The form of the projection allows the signal to be directed precisely onto the resistance or conductive-based touch-sensitive technology forming the input on the device to enable the wearer to closely and accurately control the operation of the device. In addition, the form of the projection provides a visual indication to the wearer of the point of contact of the projection with the input of the device.

Numerous other aspects, features, and advantages of the present invention will be made apparent from the following detailed description together with the drawings figures.

BRIEF DESCRIPTION OF THE DRAWINGS

The drawings illustrate the best mode currently contemplated of practicing the present invention.

In the drawings:

FIG. 4 is a front isometric view of a third embodiment of the conductive member of the garment of FIG. 1; and FIG. 5 is a cross-sectional view along line 5-5 of FIG. 4.

DETAILED DESCRIPTION OF THE INVENTION

Figure 1:
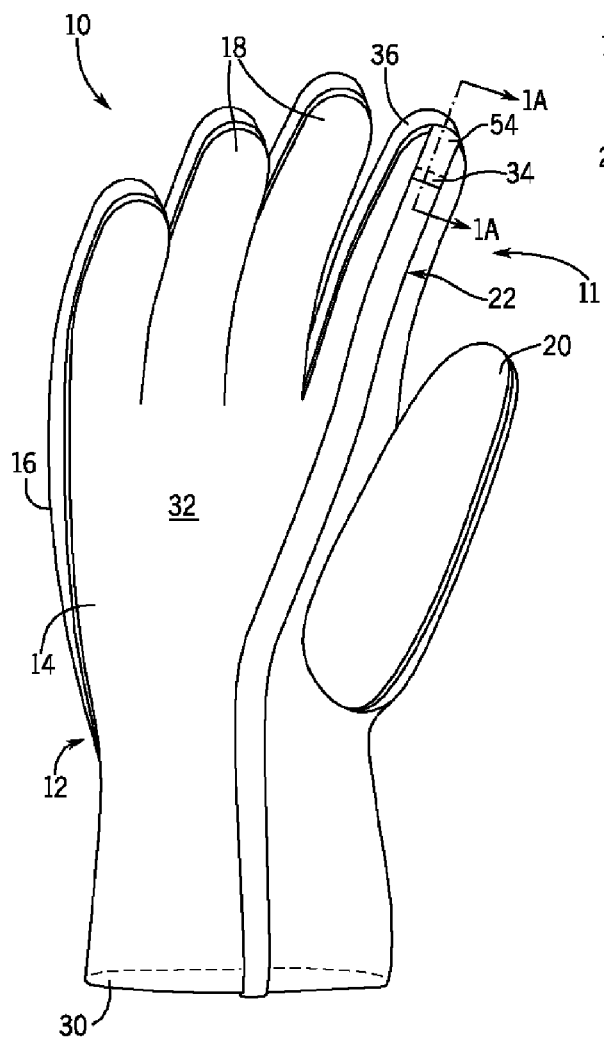
FIG. 1 is a front isometric view of a one embodiment of a garment constructed according to the present disclosure.
Figure 1A:
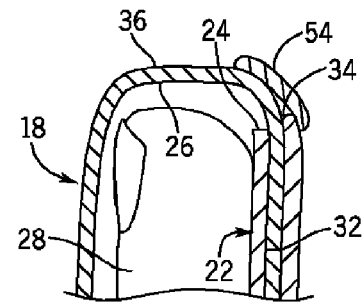
FIG. 1A is a cross-sectional view along line 1A-1A of FIG. 1.

Referring now in detail to the drawing figures, wherein like reference numerals represent like parts throughout the several views, one embodiment of a garment constructed according to the present disclosure is illustrated generally at 10. The garment 10, which in the illustrated embodiment is formed as a glove 11 but can also be any type of garment worn by an individual, includes a shell 12 formed of a suitable waterproof or weather proof material. The shell 12 is shaped to conform to the portion of the body of the wearer on which the garment 10 is to be worn. In the illustrated embodiment, the shell 12 is formed to conform to the shape of a hand with a palm portion 14, a back portion 16, a number of finger stalls 18 and a thumb stall 20. In one embodiment, the shell 12 is formed as a single member, without any breaks in the shell 12 such that the shell 12 provides continuous waterproof and/or weatherproof protection over the entire hand of the wearer, though a shell 12 formed of multiple components joined to one another to form the unitary or single member is also contemplated.

Figure 2:
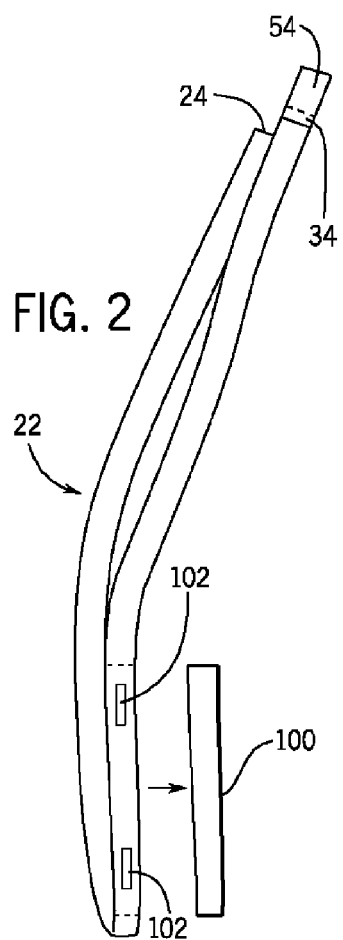
FIG. 2 is a perspective view of the a first embodiment of a conductive member of the garment of FIG. 1.
Figure 3:
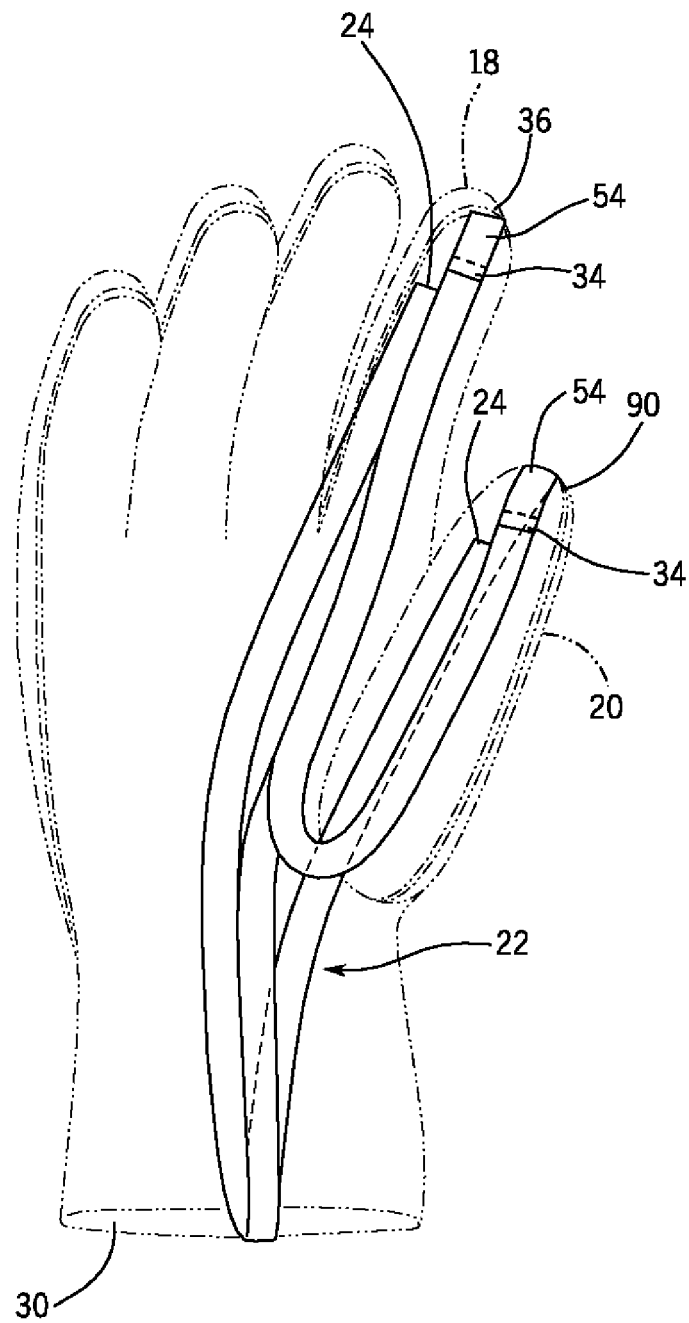
FIG. 3 is a partially broken-away front isometric view of a second embodiment of the conductive member of the garment of FIG. 1.

Referring now to FIGS. 1-3, the garment 10 additionally includes a conductive member 22. The conductive member 22 is formed of a flexible and electrically conductive material, such as a silver plated or copper/polyester taffeta strip material that is 0.08 mm in thickness with a mass of 80 g/m², silver plated polyester/Lycra® fabric, or a conductive adhesive or ink that can be printed on the shell 12, or a sufficiently conductive number of conductive material threads (not shown) applied to the shell 12 in the desired configuration, among others, which enables electrical signals to pass along the conductive member 22. A first end 24 of the conductive member 22 is attached to the shell 12 in a suitable manner, such as by stitching, adhering or otherwise securing the first end 24 to the interior surface 26 of the shell 12 at a location where the first end 24 is able to be easily contacted by a portion of the hand, and/or the finger 28 of the wearer. From the first end 24, the conductive member 22 is attached to and extends along the interior surface 26 of the shell 12 to an aperture 30 formed in the shell 12 that is used to put on and take off the garment 10, such as a cuff opening through which the wearer can insert into and remove a hand from the garment 10. In an alternative embodiment, the aperture 30 can be formed in the shell 12 at a location adjacent the palm portion 14 and/or the back portion 16, and opposite from the finger stalls 18 and thumb stall 20, such that the aperture 30 is not positioned at a location in the shell 12 that exposes the hand to the environment outside of the garment 10.

The conductive member 22 passes through the aperture 30 and extends onto the exterior surface 32 of the shell 12. On the exterior surface 32, the conductive member 22 is attached to the exterior surface 32 and extends to a second end 34 that is positioned on the exterior surface 32 at a location where the second end 34 of the conductive member 22 can be positioned to interact with an input or control element (not shown) of an electronic device (not shown), including, but not limited to, phones, pagers, communicators, electronic organizers, personal digital assistants, tablet computers and digital audio and/or video playing devices such as iPods® and MP3 players. In the embodiment shown in FIGS. 1-2, the second end 34 is located on a tip 36 of a finger stall 18, such that the conductive member 22 can be manipulated as a result of movement of the finger 28 in the stall 18 into engagement with the touch-sensitive interface of an electronic device. In FIG. 3, the conductive member 22 includes a pair of first ends 24 that are positioned on the interior surface 26 of both the finger stall 18 and the thumb stall 20, and a pair of second ends 34 that are positioned on the exterior surface 32 at the tips 36, 90 of the finger stall 18 and the thumb stall 20, respectively, to provide additional points of contact between the wearer and the touch-sensitive device.

In order to engage in interface and provide input to the device, the wearer manipulates the finger stall 18 within which the first end 24 of the conductive member 22 is located and on which the second end 34 is disposed to place the second end 34 in contact with the control element of the device. Where the control element of electronic device is or includes a capacitive-type touch-sensing interface, the conductive member 22, with the first end 24 in contact with the finger 28 and the second end 34 in contact with the capacitive-type touch-sensing interface, enables transmission of the conductive properties of the finger 28 to from the first end 24 to the second end 34 such that the conductive properties of the finger 28 can be utilized through the conductive member 22 to operate the interface. Further, as the conductive member 22 extends along the interior surface 26 and exterior surface 32 of the shell 12, without penetrating the shell 12 at any point, the integrity of the waterproof and/or weatherproof properties of the shell 12 is maintained.

In alternative embodiments, the conductive member 22 can be formed of a flowable material having conductive properties, such as a conductive ink or adhesive positioned on the interior and exterior surfaces 26, 32 of the shell 12, such as by printing the ink or adhesive thereon, and multiple conductive members 22 can be disposed on the various portions of the shell 12 to form separate or connected points of contact between the body of the wearer located within the garment 10 and the second ends 34 of the members 22. Additionally, depending upon the particular form of the conductive member(s) 22 located on one or both of the interior surface 26 and the exterior surface 32, a separate connecting member (not shown) can be utilized to extend around or through the aperture 30 and operably connect the portions of the conductive member 22 located on the various surfaces 26,32 of the shell 12. Further, to enhance the ability of the conductive member 22 to conform to the shape of the shell 12, the member 22 can be formed of a number of different sections (not shown) each connected to one another to form the conductive member 22.

Also, one or more additional layers (not shown) can be disposed on the interior or exterior of the shell 12 to provide a garment 10 more suited to its intended use. In this embodiment, the conductive member 22 can either extend from the interior of the shell 12 through the aperture 30 to a location between the shell 12 and the additional layer positioned around the shell 12, or onto the exterior of the additional layer. In the embodiment where the conductive member 22 extends between the shell 12 and the additional layer, the additional layer can be formed to completely cover or enclose the aperture 30 in the shell 12. Thus, when the conductive member 22 is routed from the aperture 30 to between the shell 12 and additional layer, the conductive member 22 can be completely covered by the additional layer.

In another embodiment, at the tip 36, 90 the second end 34 is optionally joined to a contact 54, that in one embodiment is formed of a suitable conductive material, such as a silver plated polyester/Lycra® fabric that is 0.50 mm in thickness with a mass of 130 g/m$^2$ that is approximately 0.75" in length and 2" in width strip, and is folded to form the contact 54. The second end 34 of the conductive member 22 is joined to the contact 54 just below the tip 36, 90 of the stall 18, 20.

For both contacts 54, the contacts 54 are positioned on the exterior surface 32 at a location where the contacts 54 can interact with an input or control element (not shown) of an electronic device (not shown), including, but not limited to, phones, pagers, communicators, electronic organizers, personal digital assistants, tablet computers and digital audio and/or video playing devices such as iPods® and MP3 players, e.g. the tips 36, 90 of the stalls 18, 20. In the embodiment shown in FIGS. 1-3, the electric signal generated by the body of the wearer is transmitted from the first end 32 along the conductive member 22 to the second end 34 where it reaches the contact 54. When the contact 54 is in contact with a touch-sensitive device, the signal at the contact 54 is recognizable by and can operate the device without having any direct contact of device with the body of the wearer. In this manner the wearer can interact with the device using the garment 10 without removing the garment 10, and without the garment 10 being formed with any apertures, holes or other points of entry into the garment 10 that could compromise the integrity of the waterproof and/or weatherproof properties, etc., of the garment 10.

In this embodiment, in order to engage and provide input to the device, the wearer manipulates the finger stall 18 or thumb stall 20 on which the contact(s) 54 are located to place one or more of the contacts 54, and thus the conductive member 22, in contact with the control element or input (not shown) of the device. Where the control element of electronic device is or includes a capacitive-type touch-sensing interface, the conductive member 22 operates to generate a conductive signal that is transmitted to the contacts 54 disposed in contact with the capacitive-type touch-sensing interface to operate the interface.

Looking now at FIGS. 4 and 5, to more specifically focus the signals generated by the members 22 to more precisely control the device via the touch-sensitive interface, each contact 54 includes a projection 38 disposed on the tips 36, 90 of the stall 18, 20, though only one contact 54 and projection 38 may be present on either stall 18 or 20 in other embodiments. In one embodiment, the projection 38 includes an outer portion 40 and an inner portion 42, though the projection can be formed entirely by the material of the outer portion 40, if desired. The outer portion 40 is operably connected to the conductive member 22 at the tip 36, 90 of the stall 18, 20. In one embodiment, the signals travelling along the member 22 can be conducted onto the outer portion 40, which is also formed from a conductive material. Additionally, the outer portion 40 can be formed as an extension of the conductive member 22.

The outer portion 40 is affixed to the tip 36, 90 of the stall 18, 20 by any suitable means such as by stitching or an adhesive, among others, and either partially or totally covers the inner portion 42. The inner portion 42 is disposed against and secured to the tip 36 of the stall 18 in any suitable manner and projects outwardly therefrom. The inner portion 42 has a shape that tapers or narrows from the tip 36, 90 towards the outermost end 44 of the inner portion 42, e.g., the inner portion 42 can be angled or curved. The tapering of the inner portion 42 to the outermost end 44 provides a narrow engagement surface for the conductive member 22/outer portion 40 that is capable of engaging or contacting a touch-sensitive interface on a device. The outer portion 40 is positioned over the inner portion 42 and secured in that position, such that the outer portion 40 conforms to the shape of the inner portion 42, thus providing the outermost end 44 as a single, small contact point for the conductive member 22 on the tip 36, 90.

In this manner the projection 38 provides a contact point on the garment for the conductive member 22 that enables very precise contact of the conductive member 22, via the outer portion 40 of the projection 38, with the touch-sensitive interface of the conductive device, such that a wearer can precisely control the device via the interface without having any stray or multiple contact points between the conductive member 22 and the device interfering with the wearer's control of the device. Additionally, the form and placement of the projection 38 on the tip 36, 90 enables the wearer to see the outermost end 44 of the projection 40 opposite the tip 36, 90, such that the wearer can precisely direct the end 44 of the projection 40 into engagement with the device. In one embodiment, the projection 40 is positioned on the tip 36, 90 closer to the back portion 16 of the glove 10, such that the projection 40 is disposed in a more visible location when the garment 10 is in use.

In alternative embodiments, as opposed to a single layer garment formed exclusively by the shell 12, the shell 12 can form an inner liner or other part of a multilayer garment 10. In this embodiment, the conductive member(s) 22 is disposed on the exterior of the shell 12 such that the wearer does not contact the member 22, but the conductive member 22, projection 38 and/or contact 54 can project outwardly from the outer layers (not shown) in order to be positionable in contact with a touch-sensitive interface of an electronic device. In another alternative embodiment the conductive member 22 can be formed from a number of interconnected sections of a conductive material that are joined to one another to form the conductive member 22. The sections can be formed of the same or dissimilar materials, so long as each section is capable of transmitting the electric signal from the first end 24 to the second end 34 of the conductive member 22.

In still another embodiment, the conductive member 22 can be formed to have a separable component 100 (FIG. 2) that can be removed from the garment 10 and used as a separate conductive member for engagement with a conductive device, such as a stylus. The component 100 can be adhered to the garment 10 and/or to the remainder of the conductive member 22 on the garment 10 in any suitable manner, such as by a hook and loop attachment mechanism 102. In addition, the separable component 100 can be formed with a configuration different than that of the remainder of the conductive member 22. For example, in an embodiment where the remainder of the conductive member 22 is formed of a flexible strip of a conductive material, the separable component 100 can be formed with a more rigid, tubular or rod-like construction that can effectively connect and conduct signals when engaged with the remainder \conductive member 22 on the garment 10, but that can also provide a relatively rigid construction when used separately from the garment 10. With this construction, the mass of the remainder or non-separable component of the conductive member 22 secured to the garment 10 can be reduced, as the separable component 100 can be formed with a greater share of the mass to enhance the electric signals passing along the conductive member 22 for operating a device.

Various other embodiments of the present invention are contemplated as being within the scope of the filed claims particularly pointing out and distinctly claiming the subject matter regarded as the invention.

The invention claimed is:

1. A garment comprising:
   a) a shell adapted to receive a portion of a body of a wearer therein, the shell having an interior surface, an exterior surface and an aperture through which the portion of the body of the wearer is to be inserted; and
   b) at least one conductive member having a first end disposed on the interior surface of the shell, a second end disposed on the exterior surface of the shell, and extending between the first end and the second end through the aperture to connect the first end and the second end, wherein the conductive member does not penetrate the shell at any point along the conductive member, wherein the garment is a glove having a number of finger stalls, a thumb stall, a palm portion and a back portion, and wherein the aperture is spaced from the palm portion or back portion opposite the finger stalls and thumb stall, and wherein the second end of the at least one conductive member includes a first portion extending between a tip of one finger stall and the palm portion and a second portion extending between a tip of the thumb stall and the first portion.

2. The garment of claim 1 wherein the at least one conductive member is formed from a conductive fabric material.

3. The garment of claim 1 wherein the at least one conductive member is affixed at one end to a projection disposed on the exterior surface of the shell.

4. The garment of claim 3 wherein the projection includes an inner portion secured to the exterior surface of the shell and an outer portion secured to the inner portion and optionally the shell.

5. The garment of claim 4 wherein the inner portion has a tapered shape.

6. The garment of claim 4 wherein the outer portion is integrally formed with the conductive member.

7. The garment of claim 3 wherein the projection is positioned on the shell at a location that provides a visual indication to the wearer of the point of contact of the projection with a device.

8. The garment of claim 1 further comprising a first conductive member disposed on the interior surface and a second conductive member disposed on the exterior surface and connected to the first conductive member.

9. The garment of claim 1 wherein the at least one conductive member is formed of a flowable material capable of adhering to the shell.

10. The garment of claim 1 further comprising a contact disposed on the exterior surface of the shell and formed of a conductive material, the contact operably connected to the at least one conductive member.

11. The garment of claim 1 wherein the shell is formed as a unitary structure.

12. The garment of claim 1 wherein the shell forms an inner layer of a multilayer garment.

13. The garment of claim 1 wherein the at least one conductive member includes a separable component.

14. A method of interacting with an electronic device having a capacitive-type touch-sensing interface, the method comprising the steps of:
   a) providing a garment including a shell formed as a unitary structure and adapted to receive a portion of a body of a wearer therein, the shell having a number of finger stalls, a thumb stall, a palm portion and a back portion, each defining an interior surface and an exterior surface, an aperture spaced from the palm portion or back portion opposite the finger stalls and thumb stall through which the portion of the body of the wearer is to be inserted, and at least one conductive member having a first end disposed on the interior surface of the shell, a second end disposed on the exterior surface of the shell, and extending through the aperture to connect the first end and the second end, wherein the second end of the at least one conductive member includes a first portion extending between a tip of one finger stall and the palm portion and a second portion extending between a tip of the thumb stall and the first portion;
   b) inserting a body portion of the wearer through the aperture into the garment and into contact with the first end of the conductive member; and
   c) placing the second end of the conductive member in contact with the capacitive-type touch-sensing interlace.

15. The method of claim 14 wherein the first end of the conductive member is disposed on the interior surface of a finger stall, and the second end of the conductive member is disposed on the exterior surface of a finger stall, and wherein the step of placing the second end of the conductive member in contact with the interface comprises placing the finger stall with the second end thereon onto the interface.

16. The method of claim 14 wherein the aperture defines passage for the insertion of the body portion of the wearer into the garment, and wherein the step of inserting the body portion into the garment comprises inserting the body portion through the aperture.

* * * * *